United States Patent

Ekelöf et al.

[11] Patent Number: 6,155,475
[45] Date of Patent: Dec. 5, 2000

[54] METHOD FOR AUTOMATIC MULTI-LAYER WELDING

[75] Inventors: Bengt Ekelöf, Mullhyttan; Lars Sandström, Fjugesta, both of Sweden

[73] Assignee: Esab AB, Gothenburg, Sweden

[21] Appl. No.: 09/091,920

[22] PCT Filed: Dec. 20, 1996

[86] PCT No.: PCT/SE96/01721

§ 371 Date: Jun. 22, 1998

§ 102(e) Date: Jun. 22, 1998

[87] PCT Pub. No.: WO97/23324

PCT Pub. Date: Jul. 3, 1997

[30] Foreign Application Priority Data

Dec. 22, 1995 [SE] Sweden .................................. 9504607

[51] Int. Cl.[7] .................................................. B23K 9/127
[52] U.S. Cl. .......................... 228/225; 228/103; 228/105; 219/124.22; 219/124.5
[58] Field of Search ..................................... 228/103, 105, 228/144, 151, 165, 256, 9, 10, 11, 33, 225; 219/125.1, 121.56, 124.1, 124.21, 124.22, 124.5, 413, 609, 61.5, 86.41, 91.1

[56] References Cited

U.S. PATENT DOCUMENTS

| | | | |
|---|---|---|---|
| 4,186,864 | 2/1980 | Ishimaru et al. | 228/226 |
| 4,508,953 | 4/1985 | Murakami et al. | 219/125.1 |
| 4,563,745 | 1/1986 | Panzeri | 364/477 |
| 4,590,355 | 5/1986 | Normura et al. | 219/125.12 |
| 4,728,774 | 3/1988 | Hayakawa | 219/124.22 |
| 4,742,207 | 5/1988 | Nakashima et al. | 219/125.1 |
| 5,107,093 | 4/1992 | Ekelof et al. | 219/124.34 |
| 5,166,495 | 11/1992 | Ekelof et al. | 219/124.34 |
| 5,173,592 | 12/1992 | Okumura et al. | 219/125.1 |
| 5,715,375 | 2/1998 | Ito et al. | 395/93 |
| 5,841,104 | 11/1998 | Svensson | 219/125.1 |

*Primary Examiner*—Patrick Ryan
*Assistant Examiner*—Kley Stoner
*Attorney, Agent, or Firm*—Orum & Roth

[57] ABSTRACT

In a method for automatic multi-layer welding of a joint formed by two joint surfaces according to which method the contour of the joint in a number of cross-sections is established by means of a sensor emitting signals representative of the contour of the current cross-section of the joint. After evaluation, said signals control the deposition of the weld beads by means of a continuously fed electrode which is directed towards a welding zone in the joint.

20 Claims, 6 Drawing Sheets

FIG. 4
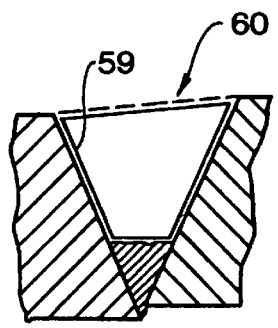
FIG. 5
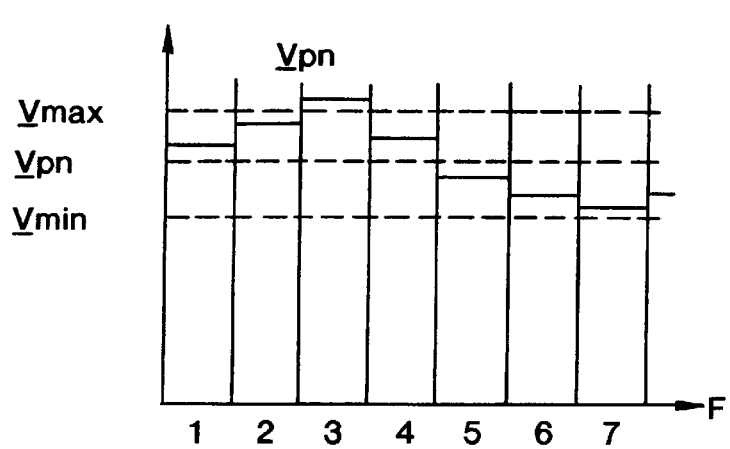
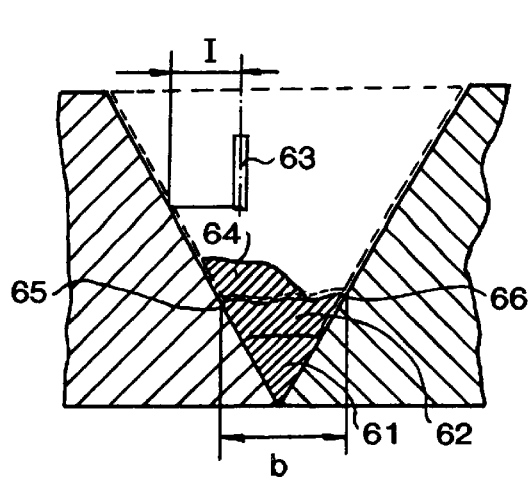
FIG. 6
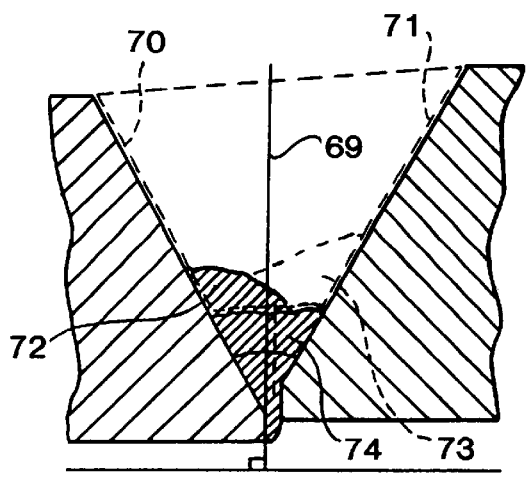
FIG. 7

METHOD FOR AUTOMATIC MULTI-LAYER WELDING

The invention relates to a method for automatic multi-layer welding of a joint formed by two joint surfaces according to which method the contour of the joint in a number of cross-sections is established by means of a sensor, such as an optical or mechanical sensor emitting signals representative of the contour of the joint in the current cross-section of the joint, which signals after evaluation control the deposition of the weld beads by means of a continuously fed electrode which is directed towards a welding zone in the joint, said sensor being caused to measure points of the present contour of the joint in the current section which essentially define the cross-section of the joint and are positioned on the joint edges, the joint sides and the joint bottom of the joint, the area ($\underline{P}_{pn}$) of the polygon determined by the measured points being calculated, the mean value ($\underline{P}_{pm}$) of said polygon areas being calculated, a mean amount of welding material per unit of length corresponding to the mean value of the polygon areas of the cross-sections of the joint being determined and the amount of welding material per unit of length for each cross-section of the joint being calculated as a function of the mean amount of welding material per unit of length and the ratio of the polygon area ($\underline{P}_{pn}$) of the cross-section of the joint to the mean value of the polygon areas ($\underline{P}_{pm}$).

In welding, account must be taken of the variations in the cross-sectional area of the weld joint along the joint. The cross-sectional area is determined, on the one hand, by the contour of the joint and, on the other hand, by a line which connects the two joint edges. In the following, this line will be referred to as the interconnection line. The cross-section of the joint often differs from the ideal shape, for example a V-shape, U-shape etc. In the case of long joints, the width of the joint usually varies, and the joint edges are often offset relative to each other, so called edge offset. The cross-sectional area along the joint therefore alters continuously on account of the geometric imperfections of the joint, which are caused by production-engineering reasons, inter alia in the preparation the joint and change of shape during the very welding operation. In automatic welding in particular, it must be possible for these variations in the joint cross-section along the joint to be recorded, both with respect to the joint area and the joint shape so that the beads can be deposited in such a manner that a joint which is even and filled to both joint edges is obtained. In manual or semi-automatic welding, the welder can vary the welding parameters, for example the welding speed, in order to compensate for irregularities in the weld joint. In the case of automatic welding, such adaptation of the welding to these variations must be effected entirely automatically.

EP-B1-12962 describes a method of the type mentioned in the introduction. On the basis of the actual joint width scanned by a sensor, the number of weld beads to be deposited alongside each other is selected automatically, and the transition from one bead to the next is carried out in accordance with a specific procedure. However, during the welding, no account is taken of the variations in the cross-section of the joint which is affected not only by the joint width, but also to a significant extent by said edge offset.

In another proposal—U.S. Pat. No. 4,608,481—the joint is filled by means of an oscillating movement of the electrode, the shape of the joint being scanned at the same time by, for example, measuring the arc voltage during the oscillating movement at certain relative positions of the welding burner in relation to the workpiece. This procedure requires additional arrangements for the oscillating movement and separate control equipment for this movement.

To perform multi-layer welding while automatically controlling the position of a welding torch and the welding conditions based on the cross-section of the groove to be welded is also previously known, see JP-A-61-67568 and JP-A-60-99485. In this case, however, the sensing operation is effectuated during the interval between the deposition of two weld beads. This means that a number of measurements have to be done as the contour varies along the joint, causing a delay in the welding operation.

EP-B1-423 088 describes the method for multi-layer welding according to which the actual cross-section of the joint in different sections of the joint is taken as a basis for determining the welding speed by which the amount of welding material per unit of length to be deposited is varied as a function of the area of the current cross-section of the joint.

This method provides acceptable results in the case of minor edge offsets between the edges of the joint, i.e. in the case of vertical distances less than 1 mm, but does not ensure that a joint filled up to the level of both edges of the joint is formed in the case of edge offsets in excess of that value. The welding speed will be reduced at the joint side having the higher edge. The larger the edge offset, the lower the welding speed. Although the result is an increased amount of welding material per unit of length also the energy consumption per length unit increases. The result is not only an unacceptable increase of the penetration of the weld beads into the joint sides but also of the size of the molten pool, resulting in a wider and not, as desired, a higher bead. Excessively reduced welding speeds give the opposite effect, i.e. too broad and flat beads form at the higher edge side of the joint. Because of the increased risk that the supplied amount of welding material be distributed in a levelling manner across the entire cross-section of the joint the steeper the interconnection line between the joint edges becomes, it is more correct to take into account the inclination of the interconnection line rather than the very distance vertically between the joint edges. The above-mentioned method provides an acceptable result when the angle of inclination between the interconnection line and the horizontal is less than approximately 3°.

The object of the present invention thus is to provide a method in automatic multi-layer welding making it possible, also when the of edge offsets in the vertical directions exceed approximately 1 mm or the angle of inclination exceeds 3°, to produce a joint that is even and filled up to both joint edges in the transverse as well as in the lengthwise directions of the joint.

This is achieved by means of a method of the kind defined in the introduction, which is characterized in that the amount of welding material per unit of length is varied as a function of the current welding speed ($\underline{V}_{pn}$), with the welding speed ($\underline{V}_{pn}$) varying in the longitudinal direction of the joint, a set mean welding speed ($\underline{V}_{pm}$) being associated with the mean value of the polygon areas of the cross-section of the joint and the welding speed ($\underline{V}_{pn}$) of each individual cross-section of the joint being calculated as a function of the mean welding speed and the ratio of the mean value ($\underline{P}_{pm}$) of the polygon areas to the polygon area ($\underline{P}_{pn}$) of the current cross-section of the joint, in that at least two weld beads (84, 85) are deposited in the joint to form an intermediate layer when the mean value of the values corresponding to the width of the joint in the various cross-sections of the joint at the level of said intermediate layer exceeds a predetermined set value, and in that the amount of welding material in the transverse direction of the joint is varied as a function of the current wire feed speed ($\underline{V}^x_{t\,pn}$), the polygon determined by the measurement points being divided, in the latter case, by a vertical (87) through the joint in a first and a second part polygon (88, 89) comprising the measurement points on their respective one of the joint sides and the joint edges, the wire feeding speed ($\underline{V}^x_{t\,pn}$) for the weld beads to be deposited respectively on one and on the other joint side being determined with respect to each cross-section of the joint as a function of the current mean wire feed speed ($\underline{V}_{tpnm}$) and the relationship between the part polygon areas, the mean wire feed speed ($\underline{V}_{tpnm}$) for the various cross-sections of the joint being constant, i.e. the mean wire feed speed ($\underline{V}_{tpnm}$) does not vary in the lengthwise direction of the joint, whereby an even welding joint, filled to the level of its two joint edges, is produced in the case of such an edge joint offset that the angle of inclination between the inter-connection line of the joint edges and the horizontal plane exceeds 3°.

Because of wire feed speed is determined as a function of the part polygon areas of the cross-section of the joint the method in accordance with the present invention provides a welding joint which is filled up to its two joint edges, also in the case of edge offsets in excess of 1 mm. Should an edge offset between the edges of the joint appear in the preliminary preparation of the joint the part polygon area at the joint side having the higher joint edge will be larger than that of the part polygon area at the other joint side. Consequently, the weld beads to be deposited against the respective joint sides must receive an amount of welding material that is adjusted to the respective part polygon areas. The amount of welding material is controlled by the wire feed speed, such that the supply of welding material is more rapid at higher values, i.e. the higher the wire feed speed, the larger the amount of welding material supplied to the current joint side per time unit. Since the amount of welding material per unit of length increases whereas the energy supply per unit of length is less than in the case of the method of EP-B1-423 088, the weld bead is heated to a lesser extent and the undesired spreading of the bead, which is a consequence of such heating, is avoided, i.e. the resulting weld bead is higher and narrower than the weld bead produced by the above-mentioned method.

By varying the weld speed in the lengthwise direction, the volume of the joint is filled evenly and by varying the wire feed speed for each separate weld bead in the transverse direction, the filling is so distributed in the transverse direction of the joint that edge offset or other lack of symmetry in the two joint halves are compensated for.

For practical reasons the contour of the joint is established in a point-wise manner. The points become corner points in a polygon the area of which can be easily calculated with the aid of some suitable polygon algorithm. In the case of simple joint shapes including plane joint surfaces in general only a few points are required to calculate the polygon area corresponding to the cross-section of the joint. It is conceivable to measure these points, for instance by means of an optical sensor, such as laser sensor.

The sensor is advantageously moved in synchrony with the weld head, that is to say with the welding speed. If the weld head is stationary and the workpieces are being moved relatively to the weld head, it is suitable that also the sensor is stationary. Preferably, the sensor is carried by the weld head.

It has been found to be advantageous to scan the whole joint before the welding parameters for the next bead are determined. However, the welding and scanning of the joint should take place simultaneously in order to minimize the overall time required for the welding work. When the first bead, which normally is identical with the first layer, is deposited and the sensor which is arranged in front of the weld head scans the contour of the joint, no measurement values thus exist on which to determine the welding parameters for this first bead. For the first bead, a predetermined amount of welding material per unit of length therefore is deposited, which amount preferably is the same along the whole joint. It may be advantageous for practical reasons to initially deposit several beads for the completion of the first layer, using a certain predetermined amount of welding material per unit of length.

The deposition of two beads per layer is determined preferably only in dependency of the joint width at the level of the layer.

The value determined for the polygon area ($\underline{P}_{L\,pn}$) of the intermediate layer in each cross-section of the joint may be calculated as a function of the corner points ($P_2, P_3, P_5, P_6$) of the polygon area, the corner points ($P_2$) and ($P_3$), which are the points of intersection between the joint bottom and the joint sides of the intermediate layer being measured during the deposition of the bead first deposited in that layer against one of the joint sides at a predetermined distance (I) from that joint side whereas the corner point ($P_5$), which is the point of intersection between the upper face of the first deposited bead and said one joint side is measured during the deposition of the bead deposited immediately thereafter against the other joint side, whereas the corner point ($P_6$), which is the point of interconnection between the upper face of the bead deposited against said other joint side and said other said joint side, is calculated by means of a measured height ($h_1$) of said first deposited bead, which in accordance with the formula ($h_2=(h_1 \times \underline{S}^2_{pn}/\underline{S}^1_{pn})$), wherein $\underline{S}^2_{pn}$ and $\underline{S}^1_{pn}$ are the corresponding bead areas of the two deposited beads, provides the height ($h_2$) and consequently the point of intersection in the bead deposited against the other joint side.

The beads of the intermediate layer may be increased by one bead compared with the preceding layer, should the calculated polygon area ($\underline{p}_{L\,pn}$) of the intermediate layer exceed ($S_0 \times (Z+1)$), wherein ($S_0$) is the nominal bead area, (Z) the number of beads in the preceding layer and (1) is a constant, for instance 0.5.

The bead areas of the additional beads in the same intermediate layer may be achieved by interpolation of the bead areas of the two beads deposited against the joint sides, and the corresponding wire feed speeds ($\underline{V}^x_{t\,pn}$) are proportional to the bead areas ($\underline{S}^x_{pn}$).

When at least three beads are deposited in the joint to form an intermediate layer, the distance between the weld bead centers, the so called weld pitch ($\underline{L}_{pn}$), may be determined for each cross-section of the joint as a function of the so called symmetrical weld pitch ($L_0$) and the coefficient of inclination ($\underline{k}_{spn}$) of the inter-connection line of the current cross-section of the joint interconnecting the edges of said joint and/or the coefficient of inclination ($\underline{k}_{fpn}$) of the joint bottom, wherein $L_0=b/z$, and b is the width of the joint bottom of the current cross-section of the joint and Z is the number of beads in the cross-section of the joint.

Preferably, the position of the weld beads in each cross-section of the joint is obtained by so positioning the weld beads closest to the joint sides that the desired penetration into said sides is obtained, whereas the position of the intermediate beads is calculated with the aid of the distance between the bead centers, i.e. the weld pitch ($\underline{L}_{pn}$) according to the formula:

$$\underline{L}_{pn}=L_0^{(1+k)}; \quad k\geq 0$$

$$\underline{L}_{pn}=1-(1-L_0)^{(1-k)}; \quad k<0,$$

wherein $(k=(\underline{k}_{spn}-\underline{k}_{fpn})\times F)$, (F) being an empirically determined constant coefficient of intensification.

After deposition of an intermediate layer in the joint and prior to the deposition of the subsequent layer it is preferable to calculate the quotient between the mean value ($\underline{P}_{pm}$) of the polygon areas ($\underline{P}_{pn}$) of the cross-sections of the remaining cross-sections of the joint and the mean value of the cross-sectional areas of the last deposited intermediate layer, in all cross-sections of the joint, the top beads in a top layer preferably being deposited in the joint on top of said intermediate layer when the quotient is less than a predetermined set value, preferably less than 0.7.

The number of beads in the top layer may be increased by one, compared to the number of the last deposited intermediate layer, if the area (Ac) of the top layer satisfies the condition $(Ac > S_0 \times Z \times \underline{V}_{pm}/\underline{V}_{min})$, wherein ($S_0$) is the nominal bead area, (Z) the number of beads in the last deposited intermediate layer, ($\underline{V}_{pm}$) the mean welding speed and ($\underline{V}_{min}$) is the lowest conceivable welding speed.

The object of the present invention is achieved also by means of a method of the kind outlined in the introduction and which is characterised by varying the amount of welding material per unit of length as a function of the wire feed speed ($\underline{V}^x_{t\,pn}$) and/or the welding speed ($\underline{V}_{pn}$), and, in the case of deposition of at least three beads in the joint to form an in intermediate layer, calculating the distance between the weld-bead centers, the so called weld pitch ($\underline{L}_{pn}$) with respect to each cross-section of the joint as a function of the so called symmetrical weld pitch ($L_0$) and the coefficient of inclination ($\underline{k}_{spn}$) of the interconnection line of the current cross-section of the joint that interconnects the edges of said joint and/or the coefficient of inclination ($\underline{k}_{fpn}$) of the joint bottom, wherein ($L_0 = b/Z$) and b is the width of the joint bottom of the current cross-section of the joint and (Z) the number of beads in the cross-section of the joint.

By employing not only a wire feed speed that varies across the cross-section of the joint but also a weld pitch that varies across the cross-section of the joint, should the number of beads in the layer amount to at least three, it is ensured that a joint filled up to its two edges is achieved also in the case of considerable edge offset.

The invention will be described in greater detail with reference to the attached drawings illustrating two embodiments to be used in connection with the method of the present invention.

FIGS. 1*a*, 1*b*, 1*c* show a section through a V-type joint during different stages of the welding.

FIGS. 2*a*, 2*b*, 2*c* show the edge offset in a butt joint in cylindrical workpieces.

FIG. 4 shows a V-type joint for clarification of certain terms used in the description.

FIG. 5 shows a diagram of calculated welding speeds with respect to different joint cross-sections.

FIG. 6 shows a correct V-type joint in the case of deposition of a layer comprising two beads.

FIG. 7 shows a V-type joint with an edge offset in the case of deposition of a layer comprising two beads.

Figure 11A:
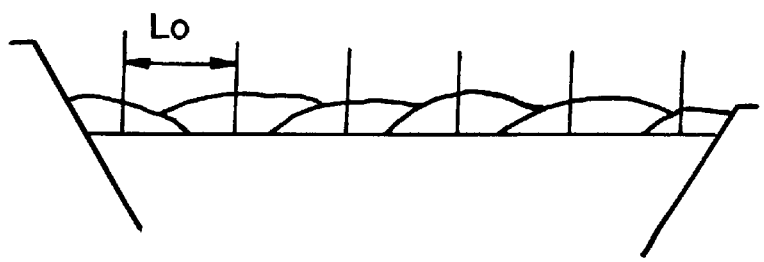

FIG. 11*a* shows a joint filled by symmetrically arranged weld beads.

Figure 11B:
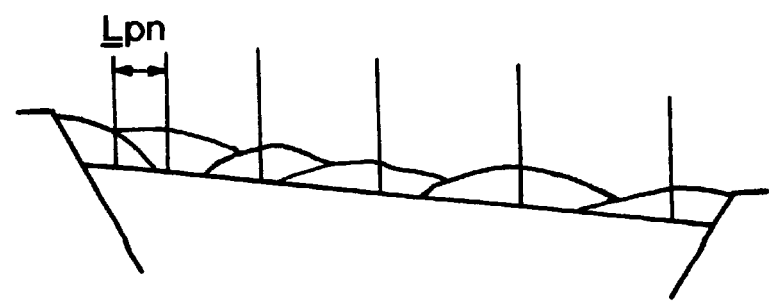

FIG. 11*b* shows the same joint as in FIG. 11*a* except that it is filled by asymmetrically arranged weld beads.

Figure 12:
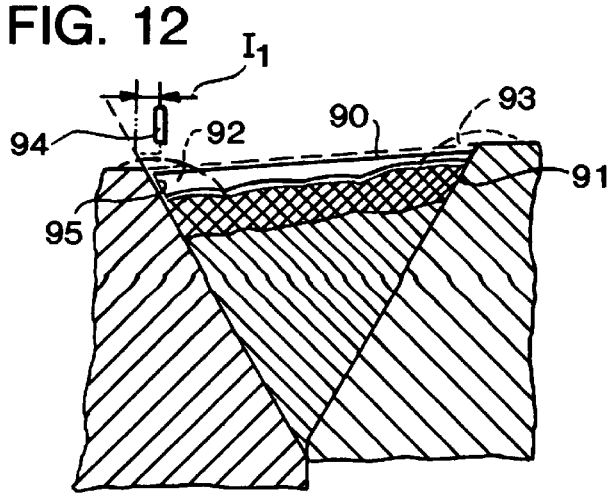

FIG. 12 shows a V-type joint before deposition of a top layer.

Figure 13:
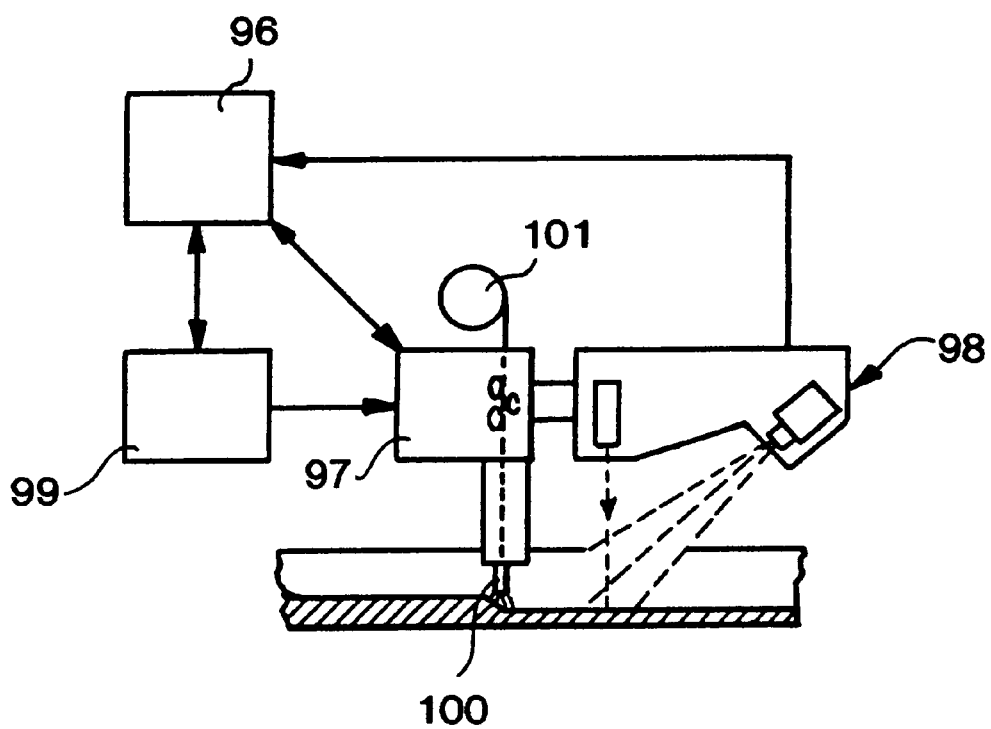

FIG. 13 shows diagrammatically an arrangement for automatic multi-layer welding.

Figure 14:
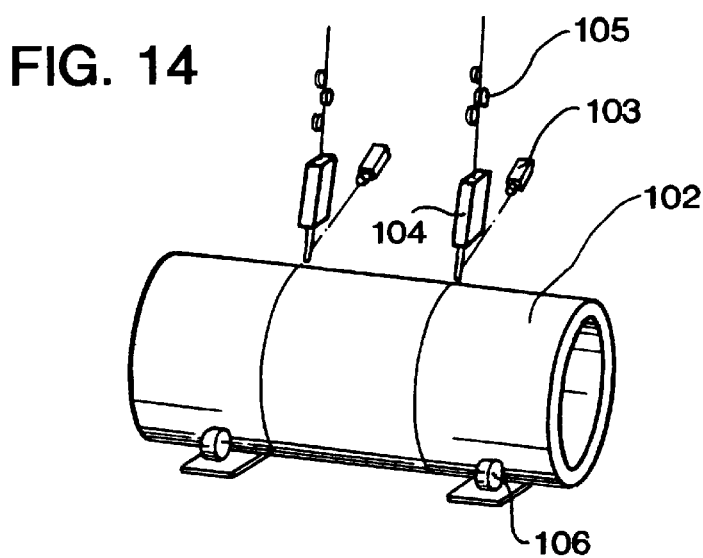

FIG. 14 shows diagrammatically a device for automatic multi-layer welding by means of two stationary weld heads.

Figure 1A:
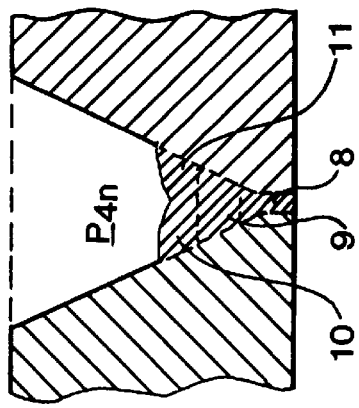
Figure 1B:
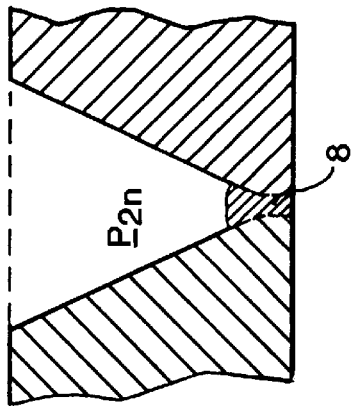

FIG. 1*a* shows a section through a V-type joint between two workpieces 1*a*, 1*b* with a gap 2, joint sides 3*a*, 3*b*, joint edges 4*a*, 4*b*, root sides 5*a*, 5*b*, and top sides 6*a*, 6*b* of the joint. The workpieces 1*a*, 1*b* are shown slightly offset in the vertical direction with respect to the joint edges 4*a*, 4*b*. The polygon area $\underline{P}_{1n}$ of the current cross-section is limited by the joint sides 3*a*, 3*b*, the gap 2 and an imaginary line 7 between the two joint edges 4*a*, 4*b*. In this specification this line will be denominated interconnection line. FIG. 1*b* shows the same joint with a root bead 8. The polygon area is now smaller and is designated by $\underline{P}_{2n}$.

The root bead 8 is deposited along the whole joint with fixed welding parameters. These so called nominal values are chosen prior to the welding operation and are determined by the workpieces to be welded together, the quality requirement on the finished weld and the appearance of the current unfilled weld joint. In this respect it should be noted that the cross-section of the joint varies along the joint on account of manufacturing tolerances, especially as regards the joint width, the joint offset and changes in shape during welding. When $\underline{P}_{1n}$ is first sensed in connection with the deposition of the first bead in the joint this first bead is deposited along the entire joint at a constant nominal welding speed $V_0$ and at a constant nominal wire feed speed $V_{r0}$ of the welding electrode. In consequence thereof the cross-sectional area $\underline{S}^x_{pn}$ of the deposited bead will be identical along the whole joint, namely $\underline{S}^x_{pn} = S_0 = (t \times v_{r0})/v_0$, t being the cross-sectional area of the welding electrode an $S_0$ the nominal bead area. In this case index x designates the ordinal number of the current bead, p designates the current layer and n designates the current cross-section of the joint. Upon deposition of the first bead 9 in the second layer of the joint it is the remaining polygon area $\underline{P}_{2n}$ that is dimensioned in adaptation to the welding speed and the wire feed speed. This polygon area $\underline{P}_{2n}$ is established with respect to each individual cross-section of the joint in connection with the deposition of said bead and it is used to calculate the welding parameters of the bead 9. Since $\underline{P}_{2n}$ varies in the lengthwise direction of the joint for the reasons mentioned above, also the amount of welding material per unit of length must vary in the longitudinal direction of the joint if an evenly filled joint is to be obtained. The amount of welding material per unit of length varies as a function of the welding speed and the wire feed speed, and by varying one or the other or both of these welding parameters an amount of welding material adapted to the cross-section of the current joint is obtained. The manner in which the welding speed or wire feed speed are calculated with respect to the current cross-section of the joint will be described with reference to the first embodiment illustrated in FIG. 3 and to the second embodiment illustrated in FIG. 14.

Figure 1C:
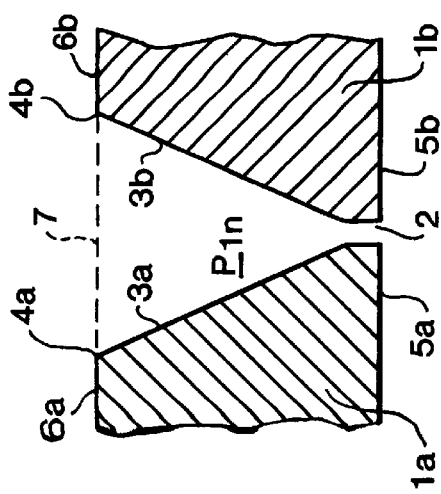

FIG. 1*c* illustrates the same joint after deposition of two more beads 10, 11. Currently, upon deposition of the first and the second beads 10, 11 in the third layer of the joint it is $\underline{P}_{3n}$ that governs the dimensions of the welding parameter.

Another factor of great importance to the manner in which the weld beads are to be deposited in the current joint cross-section is the size of the vertical distance between the joint edges. Usually, the distance is referred to as the edge offset.

Figure 2A:
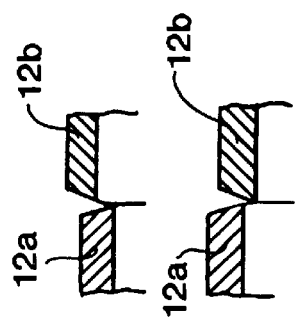
Figures 2B, 2C:
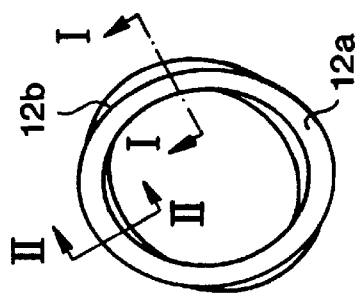

An edge offset generally occurs in butt-joint welding of large pipes or cylindrical containers. The cross-sections of the pipe or container parts to be welded together always differ slightly from the shape of the circle and are elliptic or oval. When such workpieces are to welded together it is generally not possible to bring the axis systems of the elliptic or oval cross-sections into coincidence with each other. The result thereof is an edge offset in the joint which changes continuously along the whole joint. FIG. 2a shows, slightly exaggerated in the axial direction, two cylindrical workpieces 12a, 12b having elliptic cross-sections in the butt-joint position. The edge offset along section I—I (FIG. 2b) of the two workpieces 12a, 12b is the opposite to that along section II—II (FIG. 2c). As can be seen, the edge offset varies continuously around the periphery. As mentioned in the introduction of the description the offset is more correctly defined as an inclination of the line interconnecting the joint edges rather than a vertical spacing between the joint edges. Also the inclination of the current joint bottom is of importance for the manner in which the welding bead should be deposited in the joint in order to result in a weld joint that is filled to the level of both of its two joint edges despite considerable edge offset.

Figure 3:
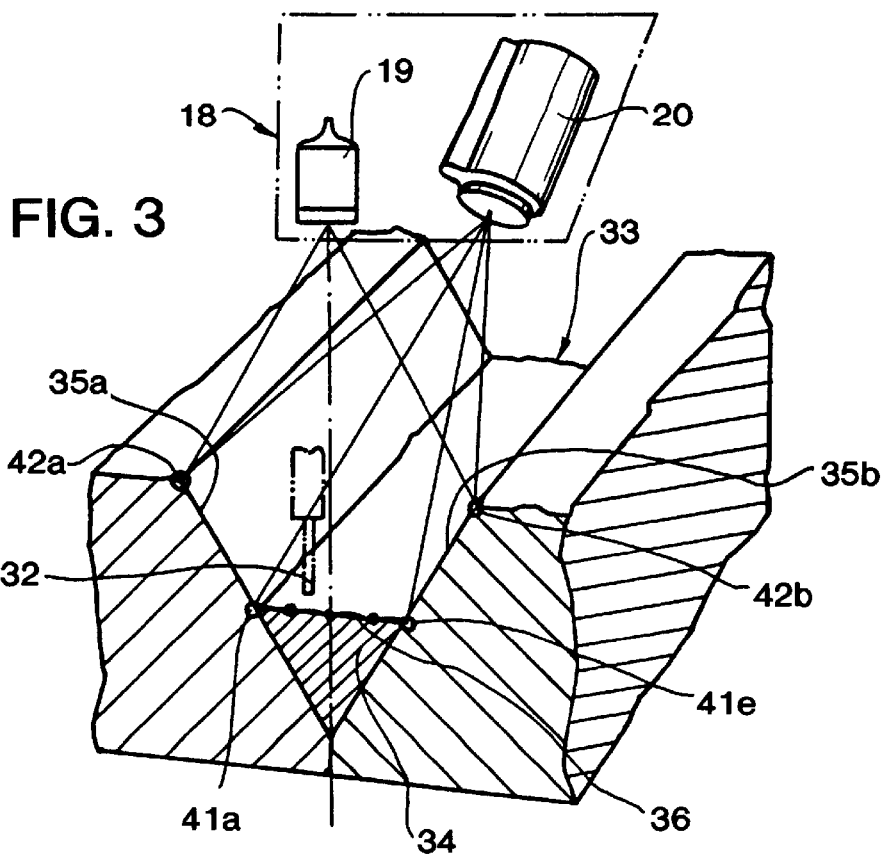
FIG. 3 shows, somewhat schematically, a device for automatic multi-layer welding by means for a movable weld head.

In accordance with the present embodiment an optical measuring unit 18 in the form of a laser diode and an optical sensor 20, supported by a weld head not shown, is used to establish the contour of the joint, i.e. the remaining polygon area, in a large number of cross-sections of the joint. In the joint 33 in which some beads 34 have already been deposited, a further bead, not visible in FIG. 3, is deposited by means of a continuously advanced electrode 32, likewise supported by said weld head and movable at least in three directions.

During the welding operation the sensor establishes the existing contour of the joint, i.e. the joint sides 35a, 35b and the bottom 36 by sensing five points 41a–e, evenly distributed across the bottom, and points 42a and 42b, one at each joint edge. As appears from the drawing figure the first and the second measurement points, 41a and 41e respectively, on the joint bottom are positioned on the line of intersection between the joint bottom and the joint sides.

The enclosed area 59 of the joint 60 (FIG. 4) intends to represent generally a polygon area $\underline{P}_{pn}$, the first index referring to the cross-sectional area established in connection with the deposition of the $P_{th}$ layer an n to the $n_{th}$ cross-section of the joint where the detection is effected. For instance $\underline{P}_{13}$ designates the polygon area of the third cross-section of the joint when the first layer is deposited.

As mentioned above, the amount of welding material per unit of length must vary as a function of the polygon area $\underline{P}_{pn}$ of the current section if an even joint is to be obtained. In accordance with the embodiment illustrated in FIG. 3 the welding speed $\underline{V}_{pn}$ varies in the lengthwise direction of the joint whereas the so called mean wire feed speed (see pages 22, 23) $\underline{V}_{tpnm}$ does not vary in the lengthwise direction of the joint. In calculating the welding speed $\underline{V}_{pn}$ of each individual cross-section of the joint an already set mean speed $\underline{V}_{pm}$ ($\underline{V}_{pm} \approx V_0$) is associated with the mean value $\underline{P}_{pm}$ of the respective polygon area $\underline{P}_{pn}$ of the associated cross-sections of the joint, whereupon the welding speed is computed by means of the formula $\underline{V}_{pn} = \underline{V}_{pm} \times \underline{P}_{pm} / \underline{P}_{pn}$.

In this connection should be pointed out that calculation of the mean value of the polygon areas of the beads in the current layer is effected in different ways with respect to the first bead of each layer than in respect to the remaining beads of said layers. Since the sensor does not measure the points for calculating the remaining polygon area of the current cross-section of the joint until in connection with the deposition of the first bead of the layer, it is not possible to compute the correct value of the mean value of the polygon areas of the cross-sections of the joint until the entire bead has been deposited. In order to calculate the welding speed of the first bead an approximation $\underline{P}_{pm} = \Sigma (\underline{P}_{p-1n} - S_0 \times Z)/n$ is used instead of the later established correct value of said quantity. However, the correct value of $\underline{P}_{pn}$ may be used.

Because of the variation of $\underline{P}_{pn}$ in the longitudinal direction of the joint the welding speed may vary from one cross-section of the joint to the next. FIG. 5 illustrates the welding speed as a function of the cross-sections of the joint. The mean value of the welding speed $\underline{V}_{pm}$ is chosen in consideration of the corresponding welding procedure. For welding engineering purposes, the welding speed variations should be contained within certain limits, in this case designated by $\underline{V}_{max}$ and $\underline{V}_{min}$. The mean value of the welding speed is chosen to ensure that, if possible, the welding speeds relative to all cross-sections of the joint computed in accordance with the formula above are within the range defined by $\underline{V}_{max}$ and $\underline{V}_{min}$. Should in any cross-section of the joint the speed exceed $\underline{V}_{max}$, this triggers off a signal which supplies for instance the operator with information prior to the deposition of the bead that the welding speed in the case of one or several cross-sections of the joint will have a value that is too high or too low. Several measures may be taken to obviate this problem. For example, the welding speed relative to these cross-sections of the joint may be limited to the allowable upper or lower limit values, since a levelling-out may be expected as the subsequent bead is being deposited. However, large deviations are a sign of a major fault in the joint preparation, which in many cases is most simply corrected by carrying out a manual welding operation with respect to the joint cross-section concerned, in which case the automatic welding operation must be interrupted and be re-started following correction of the joint.

Due to the estimated speed with the respect to these cross-sections of the joint the shift from one section to the other would take place in stages, as illustrated in FIG. 5. In practice, the speed is controlled in such a manner that the transition from one to the other speed takes place without interference, the speed across each cross-section of the joint being constant and equalling $\underline{V}_{pn}$. The difference between the calculated speeds of two adjoining cross-sections of the joint is small as a rule and a transition, adapted to this difference in speeds, is chosen also considering i.e. the masses that need to be accelerated or retarded.

In joint welds the joint width of which increases from the root towards the top side it is necessary to increase the number of beads per layer the closer one comes to the top side. In the symmetrical V-type joint without edge offset (FIG. 6), i.e. where the angle of inclination between the interconnection line and the horizontal plane is $0°$, beads 61, 62 are shown to be deposited in the first and the second layers, respectively. The width of the joint level with the third layer is such that it requires two beads to be deposited therein to fill the entire layer.

The distance of the tip 63 of the electrode to any one of the joint sides should have a set value I upon deposition of the bead 64 adjacent to the joint side. Should the distance exceed the set value the bead penetration into the basic material becomes inferior.

When the first bead 64 of the third layer is deposited against one of the joint sides by means of the electrode spaced a distance I from the joint side, the polygon area $\underline{P}_{3n}$ is measured simultaneously. In this manner a measurement of the width b between the bead edges 65, 66 of the bead 62 underneath is obtained. One has found that only one bead per layer is required when k×b<I, where b represents the above-mentioned joint width level with the current joint bottom, i.e. the upper face of bead 62, before a new layer is deposited, and k represents a factor between 0.5 and 1.0. Lower values of k are chosen in the case of joints the joint angle of which in the current layer is small, such as an I-type joints. In addition, the choice of the value of k is dependent on one or some of the welding parameters, such as the welding tension, welding current, welding speed, wire feed speed and pitch, i.e. the distance between the welding beads centers. Smaller values of k are determined by trial and error.

In the case of asymmetrical joints presenting edge offset the above-mentioned calculation gives unfavourable results and consequently, the calculation of the variation of the welding speed $\underline{V}_{pn}$ in the longitudinal direction of the joint must supplemented by calculation of one or some of the remaining welding parameters that may affect the distribution of the welding material across the cross-section of the joint, such as the wire feed speed $\underline{V}^x_{t\,pn}$. As mentioned in the introduction, a change of the welding speed cannot be employed to adapt the amount of welding material deposited across the cross-section of the joint to the existing edge offset since a reduction of the welding speed generates increased heating and melting of the current welding bead. As a result, a joint having a flat rather than an oblique top face is formed. In order to obtain even distribution of the welding material in a joint of this kind (FIG. 7), ensuring that the joint will be filled to the level of its two joint edges, a part polygon area of the left-hand and the right-hand joint halves is calculated for each cross-section of the joint. A vertical 69 dividing the polygon area $\underline{P}_{3n}$ into two part polygons $\underline{P}_D{}^1_{3n}$, $\underline{P}_D{}^2_{3n}$ is drawn from the center of the current joint bottom at right angles to the horizontal plane. The extension of the line is calculated by means of the points read by the sensor.

The part polygons $\underline{P}_D{}^1_{3n}$ and $\underline{P}_D{}^2_{3n}$ comprise the areas 70, 71 enclosed by the broken lines. The part polygon areas of the cross-section of the joint concerned are calculated with the aid of the polygon area $\underline{P}_{3n}$ which in turn is calculated with the aid of the points measured upon deposition of the first bead 72 in the third layer, using a commonly accepted polygon algorithm.

The two part polygon areas form the bases of calculation of the wire feed speed $\underline{V}^x_{t\,3n}$ across the cross-section n of the joint in the third layer of the joint comprising the two welding beads 72, 73, the wire feed speed of the first bead 72 being designated by $\underline{V}_t{}^1_{3n}$.

Figure 10:
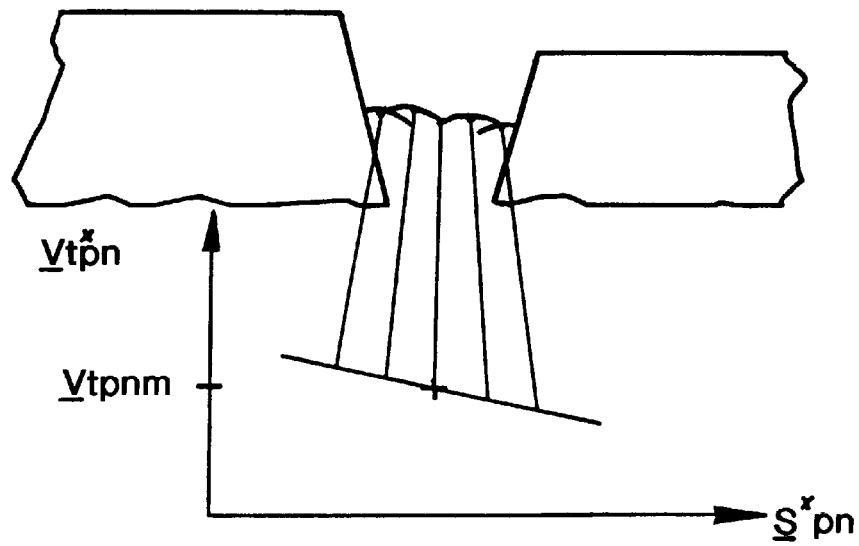
FIG. 10 shows a diagram of the variation of the wire feed speed $\underline{V}^x_{t\,pn}$ as a function of the bead area $\underline{S}^x_{pn}$.

The calculation of the wire feed speed of the two beads that are deposited against the joint sides is based on the above-calculated part polygon areas and the mean wire feed speed $\underline{V}_{t3nm}$ (FIG. 10).

$\underline{V}_t{}^1_{3n} = 2\underline{V}_{t3nm} \times 1/(1+\underline{P}_D{}^2_{3n}/\underline{P}_D{}^1_{3n})$ $\underline{V}_t{}^2_{3n} = 2\underline{V}_{t3nm} \times 1/(1+\underline{P}_D{}^1_{3n}/\underline{P}_D{}^2_{3n})$ In the absence of variation of the wire feed speed in the longitudinal direction of the joint $\underline{V}_{t3nm}$ thus is constant across all cross-sections of the joint in the current layer. This constant value of the mean wire feed speed preferably is set at $\underline{V}_{t0}$, i.e. the nominal value of the wire feed speed.

It may likewise be point out that the setting of a certain nominal value of the wire feed speed for practical reasons is achieved by setting the welding current, since the welding current varies as a function of the wire feed speed.

It should likewise be noted that the above formulas for calculation of the wire feed speed are applicable also in the case of asymmetrical joints having no edge offset, i.e. whenever the part polygons are not of equal size the wire feed speed is adjusted across the current cross-section of the joint. Consequently, in this case the first and second beads of the cross-section of the joint are not deposited at the same wire feed speed. However, the wire feed speed for the over-all cross-section of the joint, i.e. the mean wire feed speed is constant.

Figure 8:
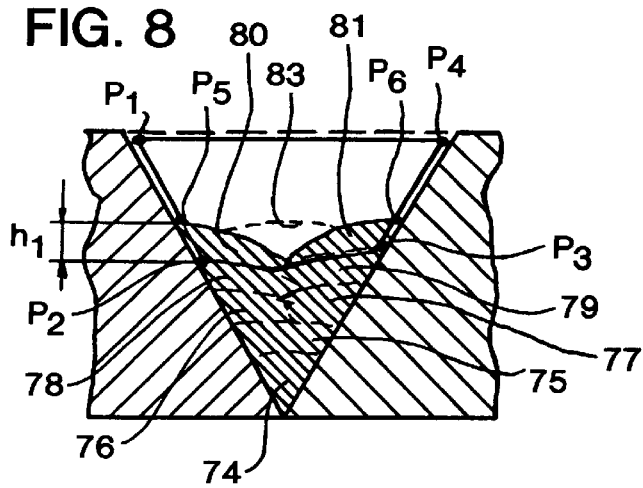
FIG. 8 shows a correct V-type joint in the case of deposition of a layer comprising three beads.

In one symmetric joint without edge offset (FIG. 8) one bead 74 and 75, respectively, and two beads 76, 77 and 78, 79, respectively have been deposited in the respective layers. Two beads 80, 81 are already deposited in the fifth layer. In order to establish whether the number of beads of the fifth layer is to be two or is to be supplemented by a further, third bead the polygon area (the so called layer area) $\underline{P}_{L5n}$ of each cross-section of the joint is first calculated. The polygon area is calculated utilising the corner points $P_2$, $P_3$, $P_5$, $P_6$ of the polygon area with the aid of a suitable established polygon algorithm, said corner points $P_2$ and $P_3$, which are the points of intersection between the joint bottom and the joint sides of the intermediate layer, being calculated during the deposition of the bead 80 against one joint side at a predetermined distance I from said joint side, said bead being the one first one deposited in this layer. The corner point $P_5$, which is the point of intersection between the upper face of the first deposited bead and said one joint side, on the other hand, is being measured during the deposition of the bead 81 deposited immediately thereafter against the opposite joint side. The corner point $P_6$, which is the point of intersection between the upper face of the bead deposited against the other joint side and said second joint side, on the other hand, is calculated with the aid of measured height $h_1$ of said first deposited bead which according to the formula $h_2=(h_1 \times \underline{S}^2_{5n}/\underline{S}^1_{5n})$, wherein $\underline{S}^2_{5n}$ and $\underline{S}^2_{5n}$ are the corresponding bead areas of the two deposited beads, provides the height $h_2$ of and consequently the point of intersection $P_6$ of the bead deposited against the other joint side.

When the calculated polygon are $\underline{P}_{L5n}$ of the intermediate layer exceeds $S_0 \times (Z+1)$, wherein $S_0$ is a nominal bead area, Z the number of beads of the previous layer and L is a constant, for instance 0.5, a third bead 83 is deposited in the fifth layer. The number of beads may only be increased by one for each layer.

The bead area of the third bead 83 suggested here in said layer or the totally ninth bead of the joint is $\underline{S}^3_{5n}$. The welding speed of the said bead equals that of the other beads of the current cross-section of the joint but varies in the longitudinal direction of the joint. Since the joint is symmetric the above-defined part polygon areas are here of equal size, with the result that the wire feed speed of the individual beads is constant and equals the mean wire feed speed $\underline{V}_{t5nm}$.

Figure 9:
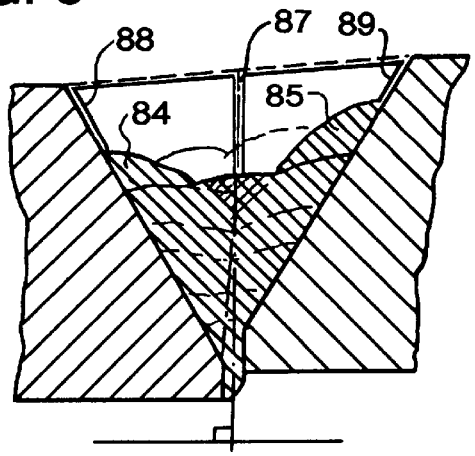
FIG. 9 shows a V-type joint with an edge offset, in the case of deposition of a layer comprising four beads.

In the case of a joint with edge offset (FIG. 9) and several beads per layer, the wire feed speed is determined, with respect to the two beads 84, 85 abutting against the joint sides, in a new layer as a function of one part polygon area each and the mean wire feed speed. The polygon area is divided by the vertical 87 into two halves the areas of which are enclosed in FIG. 9 by lines 88, 89 respectively.

The wire feed speed of the two outermost beads of the new layer becomes $\underline{V}_t{}^1_{6n} = 2\underline{V}_{t6nm} \times 1/(1+\underline{P}_D{}^2_{6n}/\underline{P}_D{}^1_{6n})$ $\underline{V}_t{}^2_{6n} = 2\underline{V}_{t6nm} \times 1/(1+\underline{P}_D{}^1_{6n}/\underline{P}_D{}^2_{6n})$ The bead areas current to $\underline{V}_t{}^1{}_{6n}$ and $\underline{V}_t{}^2{}_{6n}$ become $\underline{S}^1{}_{6n}$ and $\underline{S}^2{}_{6n}$, respectively.

In the case of beads to be deposited intermediate the outermost beads the bead area are calculated by linear interpolation of the bead areas of the two beads (84, 85) deposited against the joint sides, and the corresponding wire feed speeds ($\underline{V}^x_{t\,pn}$) are proportional to the bead areas ($\underline{S}^x_{pn}$). This appears from FIG. 10 which illustrates the wire feed speed $\underline{V}^x_{t\,pn}$ as a function of the bead area $\underline{S}^x_{pn}$. Contrary to the case in FIG. 9 the left hand joint edge is at a higher level than the right hand joint edge.

When the number of beads in the layer amounts to at least three, not only the wire feed speed that is variable across the cross-section of the joint is made use of but also a weld pitch which is variable across the cross-section of the joint, in order to obtain a joint which is filled up to its two joint edges also when the edge offset is considerable. As point out in the aforegoing the edge offset is more correctly expressed in this connection as an inclination of the line of interconnection of the joint edges rather than as a vertical offset of the joint edges. In this case, the inclination is expressed as a coefficient of inclination of the interconnection line. Obviously, also the coefficient of inclination of the current joint bottom is of importance to the weld pitch, since a symmetrical weld pitch may be used when the above coefficients of inclination are equal. FIG. 11b illustrates that the spacing between the welding bead centers, i.e. the pitch $\underline{L}_{pn}$, is varied as a function of the so called symmetrical pitch ($L_0$) and the coefficient of inclination ($\underline{k}_{spn}$) of the interconnection line of the current cross-section of the joint between its joint edges and the coefficient of inclination ($\underline{k}_{fpn}$) of its joint bottom. To compute the pitch $\underline{L}_{pn}$ a value of $L_0$ is first computed, which value equals the pitch in a symmetrical joint having no edge offset, i.e. $L_0 = b/Z$, wherein b is the width of the joint bottom of the joint cross-section concerned and Z is the number of beads in the cross-section of the joint. FIG. 11a, on the other hand, illustrates the same joint as FIG. 11b but having a symmetrical pitch, i.e. $\underline{L}_{pn} = L_0$.

In the joint illustrated in FIG. 11b the positions of the beads closest to the joint sides are first decided on the basis of the desired penetration in the joint sides, whereas the positions of the intermediate beads are calculated on the basis of the distances between the bead centers, i.e. the weld pitch ($\underline{L}_{pn}$), according to the formula:

$$\underline{L}_{pn} = L_0^{(1+k)}; \; k \geq 0$$

$$\underline{L}_{pn} = 1 - (1-L_0)^{(1-k)}; \; k < 0,$$

wherein $k = (\underline{k}_{spn} - \underline{k}_{fpn}) \times F$, F being an empirically determined, constant coefficient of intensification. F may be for instance 2. Instead of calculating the value of $\underline{L}_{pn}$ with the aid of the formula above, resulting in a displacement of the beads toward the higher side, i.e. the left-hand side in FIGS. 11a and 11b, the following formulas may also be used:

$$\underline{L}_{pn} = L_0^{(1/1+k)}; \; k \geq 0 \quad \underline{L}_{pn} = 1 - (1-L_0)^{(1/1-k)}; \; k < 0$$

and $$\underline{L}_{pn} = (1+k) \times L_0/(1+k \times L_0) \quad \underline{L}_{pn} = 1 - (1-k) \times (1-L_0)/((1-k) \times (1-L_0)); \; k < 0.$$

The first of these two formulas result in a displacement towards the lower side whereas the second one of these formulas result in a symmetrical displacement.

When the welding of one layer is completed a check is performed to establish whether the following layer is to be a top layer that completes the welding operation. The mean value $\underline{P}_{pm}$ of the remaining polygon areas $\underline{P}_{pn}$ of the cross-section of the joint, illustrated by the enclosed area 90 in FIG. 12, is calculated, whereupon a quotient is computed from this mean value $\underline{P}_{pm}$ and the mean value of the cross-sectional area of the last deposited intermediate layer in all cross-sections of the joint. A cross-sectional area of this type is illustrated as a cross-hatched area 91 in FIG. 12 and is computed as $S_0 \times Z$, where $S_0 \times Z$ is a nominal bead area and Z is the number of beads in the last deposited layer. When this quotient is less than 0.7 the following layer is executed in the form of a top layer. The number of beads in the top layer is increased by one, compared with the number of the latest deposited intermediate layer if the area Ac of the top layer satisfies the condition $Ac > S_0 \times Z \times \underline{V}_{pm}/\underline{V}_{min}$, wherein $S_0$ is the nominal bead area, Z is the number of beads in the last deposited intermediate area, $\underline{V}_{pm}$ is the mean welding speed and $\underline{V}_{min}$ is the lowest conceivable welding speed. In this case Ac is computed according to the formula $Ac = \Sigma(\underline{P}_{p-1n} - S_0 \times Z)/n + b \times (Cap_{min} + Cap_{max})/2$, wherein b is the width of the top layer, $Cap_{min}$ is the minimum height of the top layer and $Cap_{max}$ the maximum height of the top layer above the joint edges. Upon deposition of the two outermost beads 92, 93 the electrode tip 94 is maintained at a distance $I_1$ laterally from the joint surface 95 or its imaginary prolongation above the top side, which distance is smaller than the above mentioned distance I, i.e. $I_1 < I$ (FIG. 6). The distance $I_1$ depends on the configuration of the joint and is determined by trial and error.

All above-mentioned computing operations are carried out in a microprocessor 96 (FIG. 13), which is part of the welding equipment. The sensor 98 which is connected to a welding burner 97 emits signals representative of the measuring points to the microprocessor 96 which, based on this information among other things, on a basis of a program, calculates the values of the welding speed for each cross-section of the joint, the number of beads per layer, wire feed speed with respect to the beads, the pitch and so on. The results are converted into signals which are transmitted to the welding burner energising unit 99 and to the welding burner 97 which is provided with an advancement unit 101 for advancing the welding electrode 100. In addition, the relative positions of the sensor and of the welding burner are checked continuously for example to determine the position of the cross-sections of the joint where the scanning of the measuring points for the calculation of the polygon areas is in process.

As mentioned above the sensor carries out an extensive measurement program for each cross-section of the joint to determine the contour of the joint. These measurement values are used also to control the position of the welding burner along the joint.

In accordance with the embodiment illustrated in FIG. 14 for welding together for instance large pipe sections 102 having a diameter size of approximately 0.5–3 m and a length of approximately 4–12 m into elongate tubes having a total length of approximately 12 m, it is customary to provide the welding equipment with more than one weld head in order to shorten the overall welding time. Usually, these weld heads are stationary and consequently, contrary to the embodiment illustrated in FIG. 3, according to which the workpieces are stationary and the welding head is movable, the workpieces, i.e. the pipe sections in this case, are movable and the weld heads are stationary. As illustrated in FIG. 14 each weld head is provided with an optical sensor 103 and with a welding burner 104 having an advancement mechanism 105 for advancing the welding electrode. The tubes are displaced at the same speed by means for one roller mechanism 106 each. Since all pipes must be displaced at the same speed the welding speed will be constant for all cross-sections of the joint in a longitudinal direction of the joint. In order to obtain a welding joint which is filled up to its joint edges the amount of welding material supplied per unit of length is regulated in accordance with this embodiment by varying the wire feed speed, not only over each cross-section of the joint but also in the longitudinal direction of the joint. The wire feed speed $\underline{V}^x_{t\,pn}$ of the different beads is calculated in the same manner as previously, with the exception at the mean wire feed speed $\underline{V}_{tpnm}$, previously constant for all cross-sections of the joint, now varies in the longitudinal direction of the joint, i.e. $\underline{V}_{tpnm}$ is no longer equal to the nominal wire feed speed $V_{t0}$. The mean wire feed speed of each cross-section of the joint is calculated as a function of the average mean wire feed speed $\underline{V}_{tpmm}$ and the ratio of the polygon area $\underline{P}_{pn}$ of the current cross-section of the joint to the mean value $\underline{P}_{pm}$ of the polygon areas, the average mean wire feed speed $\underline{V}_{tpmm}$ equalling $V_{t0}$. Remaining calculations concerning weld pitch and so on will be computed in the same manner as in accordance with the embodiment of FIG. 3. The formula of establishing whether the number of beads in the top layer is to be increased by one bead or not will, however, be altered in such a manner that a quotient $\underline{V}_{pm}/\underline{V}_{min}$ is replaced by $\underline{V}_{tmax}/\underline{V}_{tpmm}$ in the formula on page 22.

Obviously, the invention is not limited to the embodiment described above but may be varied within the scope of the appended claims. For instance, the welding speed as well as the mean wire feed speed may be varied in the longitudinal direction of the joint. The distribution of the amount of welding material in the cross-direction of the joint may also be varied as a function of the wire feed speed and/or the weld pitch. For instance, the edges of the joint may be scanned by an acoustic or mechanical sensor instead of by an optical sensor. It may also be possible to scan the joint contours by means of the welding arc.

What is claimed is:

1. A method for automatic multi-layer welding of a joint (33) formed by two joint optical or mechanical sensor (33) emitting signals representative of the contour of the joint in the current cross-section of the joint, which signals after evaluation control a deposition of the weld beads by means of a continuously fed electrode (32) which is directed towards a welding zone in the joint, said sensor being caused to measure points (41*a–e,* 42*a–b*) of the present contour of the joint in the current section which essentially define the cross-section of the joint and are positioned on the joint edges, the joint sides, and the joint bottom of the joint, the area ($\underline{P}_{pn}$) of a polygon determined by these measured points being calculated, a mean value ($\underline{P}_{pm}$) of said polygon areas being calculated, a mean amount of welding material per unit of length corresponding to the mean value of the polygon areas of the cross-section of the joint being determined, and the amount of welding material per unit of length for each cross-section of the joint being calculated as a function of the mean amount of welding material per unit of length and the ratio of the polygon area ($\underline{P}_{pn}$) of the cross-section of the joint to the mean value of the polygon areas ($\underline{P}_{pm}$), characterized in that the amount of welding material per unit of length is varied as a function of a current welding speed ($\underline{V}_{pn}$), with the welding speed ($\underline{V}_{pn}$) varying in a longitudinal direction of the joint, a set mean welding speed ($\underline{P}_{pm}$) being associated with the mean value of the polygon areas of the cross-sections of the joint and the welding speed ($\underline{V}_{pn}$) of each individual cross-section of the joint being calculated as a function of the mean welding speed and the ratio of the mean value ($\underline{P}_{pm}$) of the polygon areas to the polygon area ($\underline{P}_{pn}$) of the current cross-section of the joint, in that at least two weld beads (84, 85) are deposited in the joint to form an intermediate layer when the mean value of the values corresponding to the width of the joint in the various cross-sections of the joint at the level of said intermediate layer exceeds a set value, and in that the amount of welding material in the transverse direction of the joint is varied as a function of the current wire feed speed ($\underline{V}_{tXpn}$), the polygon determined by the measurement points being divided, in the latter case, by a vertical (87) through the joint in a first and a second part polygon (88, 89) comprising the measurement points on their respective one of the joint sides and the joint edges, the wire feed speed ($\underline{V}_{tXpn}$) for the weld beads to be deposited respectively on one and on the other joint side being determined with respect to each cross-section of the joint as a function of the current mean wire feed speed ($\underline{V}_{tpnm}$) and a relationship between the part polygon areas, the mean wire feed speed ($\underline{V}_{tpnm}$) for the various cross-sections of the joint being constant, i.e. the mean wire feed speed ($\underline{V}_{tpnm}$) does not vary in the lengthwise direction of the joint, whereby an even welding joint, filled to the level of its two joint edges, has an edge joint offset having an angle of inclination between an interconnection line of the joint edges and the horizontal plane exceeding 3°.

2. A method as claimed in claim 2, wherein the value determined for the polygon area ($\underline{P}_{Lpn}$) of the intermediate layer in each cross-section of the joint is calculated as a function of corner points ($P_2$, $P_3$, $P_5$, $P_6$) of the polygon area, the corner points ($P_2$) and ($P_3$), which are the points of intersection between the joint bottom and the joint sides of the intermediate layer, being measured during the deposition of the bead (80) first deposited in that layer against one of the joint sides at a predetermined distance (I) from that joint side whereas the corner point ($P_5$), which is the point of intersection between the upper face of the first deposited bead and said one joint side is measured during the deposition of the bead (81) deposited immediately thereafter against the other joint side, whereas the corner point ($P_6$), which is the point of intersection between the upper face of the bead deposited against said other joint side and said other said joint side, is calculated by means of a measured height ($h_1$) of said first deposited bead, which in accordance with a formula ($h_2 = (h_1 \times \underline{S}^2_{pn}/\underline{S}^1_{pn})$), wherein $\underline{S}^2_{pn}$ and $\underline{S}^1_{pn}$ are the corresponding bead areas of a two deposited beads, provides the height ($h_2$) and consequently the point of intersection in the bead deposited against the other joint side.

3. A method as claimed in claim 2, wherein the beads of the intermediate layer may be increased by one bead compared with the preceding layer, should the calculated polygon area ($\underline{P}_{Lpn}$) of the intermediate layer exceed ($S_0 \times (Z+1)$), wherein ($S_0$) is a nominal bead area, (Z) the number of beads in the preceding layer and (1) is a constant, for instance 0.5.

4. A method as claimed in any claim 2 wherein the bead areas of the additional beads in the same intermediate layer are achieved by interpolation of the bead areas of the two beads (84, 85) deposited against the joint sides, and the corresponding wire feed speeds ($\underline{V}^x_{t\,pn}$) are proportional to the bead areas ($\underline{S}^x_{pn}$).

5. A method as claimed in claim 3 wherein when at least three beads (80, 81, 83) are deposited in the joint to form an intermediate layer, the distance between the weld bead centers, a weld pitch ($\underline{L}_{pn}$), is determined for each cross-section of a joint as a function of the so called symmetrical weld pitch ($L_0$ and the coefficient of inclination ($\underline{k}_{spn}$) of the inter-connection line of the current cross-section of the joint interconnecting the edges of said joint and/or the co-efficient of inclination ($\underline{k}_{fpn}$) of the joint bottom, wherein $L_0=b/Z$ and b is the width of the joint bottom of the current cross-section of the joint and (Z) is the number of beads in the cross-section of the joint.

6. A method as claimed in claim 5, wherein the position of the weld beads in each cross-section of the joint is obtained by so positioning the weld beads closest to the joint sides that a desired penetration into said sides is obtained, whereas the position of the intermediate beads is calculated with the aid of the distance between the bead centers, i.e. the weld pitch ($\underline{L}_{pn}$) according to the formula:

$$\underline{L}_{pn}=L_0^{(1+k)}; \; k\geq 0$$

$$\underline{L}_{pn}=1-(1-L_0)^{(1-k)}; \; k<0,$$

wherein $(k=(\underline{k}_{spn}-\underline{k}_{fpn})\times F)$, (F) being an empirically determined constant coefficient of intensification.

7. A method as claimed in wherein after deposition of an intermediate layer in the joint and prior to the deposition of a subsequent layer the quotient is calculated between the mean value ($\underline{P}_{pm}$) of the polygon areas ($\underline{P}_{pn}$) of the cross-sections of the remaining cross-sections (90) of the joint and the mean value of the cross-sectional areas (91) of the last deposited intermediate layer in all cross-sections of the joint, and in that top beads in a top layer are deposited in the joint on top of said intermediate layer when the quotient is less than a set value, preferably less than 0.7.

8. A method as claimed in claim 7, wherein the number of beads in the top layer is increased by one, compared to the number of the last deposited intermediate layer, if an area (Ac) of the top layer satisfies the condition $(Ac>S_0\times Z\times \underline{V}_{pm}/\underline{V}_{min})$, wherein ($S_0$) is the nominal bead area, (Z) the number of beads in the last deposited intermediate layer, ($\underline{V}_{pm}$) the mean welding speed and ($\underline{V}_{min}$) is the lowest conceivable welding speed.

9. A method for automatic multi-layer welding of a joint (33) formed by two joint surfaces comprising the steps of establishing a contour of the joint in a number of cross-sections by means of a sensor (20), such as an optical or mechanical sensor emitting signals representative of the contour of the joint in the current cross-section of the joint, which signals after evaluation control a deposition of the weld beads by means of a continuously fed electrode (32) which is directed towards a welding zone in the joint, said sensor being caused to measure points (41*a–e*, 42*a–b*) of the present contour of the joint in the current section which essentially define the cross-section of the joint and are positioned on the joint edges, the joint sides, and the joint bottom of the joint, a area ($\underline{P}_{pn}$) of a polygon determined by these measured points being calculated, a mean value ($\underline{P}_{pm}$) of said polygon areas being calculated, a mean amount of welding material per unit of length corresponding to the mean value of the polygon areas of the cross-sections of the joint being determined, and an amount of welding material per unit of length for each cross-section of the joint being calculated as a function of the mean amount of welding material per unit of length and the ratio of the polygon area ($\underline{P}_{pn}$) of the cross-section of the joint to the mean value of the polygon areas ($\underline{P}_{pm}$), characterized by varying the amount of welding material per unit of length as a function of a wire feed speed ($\underline{V}_{tXpn}$) and/or a welding speed ($\underline{V}_{pn}$), and, in the case of deposition of at least three beads (80, 81, 83) in the joint to form an intermediate layer, determining the distance between the weld-bead centers, a weld pitch ($L_{pn}$) with respect to each cross-section of the joint as a function of a symmetrical weld pitch ($L_o$) and a coefficient of inclination ($\underline{k}_{spn}$) of a interconnection line of the current cross-section of the joint that interconnects the edges of said joint and/or the coefficient of inclination ($\underline{k}_{fpn}$) of its joint bottom, wherein ($L_o=b/z$) and b is the width of the joint bottom of the current cross-section of the joint and z is the number of beads in the cross-section of the joint.

10. A method as claimed in claim 9, wherein in that at least two weld beads (84, 85) are deposited in the joint to form an intermediate layer when a mean value of the values corresponding to the width of the joint in the various cross-sections of a joint at the level of said intermediate layer exceeds a set value, in that the polygon determined by the measurement points in the latter case is divided by a vertical (87) through the joint in a first and a second part polygon (88, 89) comprising the measurement points on their respective one of the joint sides and the joint edges, the wire feed speed ($\underline{V}_{t\,pn}^x$) for the weld beads to be deposited respectively on one and on the other joint side being determined with respect to each cross-section of the joint as a function of the calculated mean wire feed speed ($\underline{V}_{tpnm}$) for the current cross-section of the joint and the relationship between the part polygon areas.

11. A method as claimed in claim 9 wherein the welding speed ($\underline{V}_{pn}$) for the different cross-sections of the joint is constant, i.e. the welding speed does not vary in a lengthwise direction of the joint whereas the mean wire feed speed ($\underline{V}_{tpnm}$) varies in the lengthwise direction of the joint, an average mean wire feed speed ($\underline{V}_{tpmm}$) corresponding to the mean value of the polygon areas of the cross-sections of the joint being determined and the mean wire feed speed ($\underline{V}_{tpnm}$) for the respective cross-sections of the joint being calculated as a function of the average mean wire feed speed ($\underline{V}_{tpmm}$) and a ratio of the polygon area ($\underline{P}_{pn}$) of the current cross-section of the joint to the mean value ($\underline{P}_{pm}$) of the polygon areas.

12. A method as claimed in claim 9, wherein in that the mean wire feed speed ($\underline{V}_{tpnm}$) and the welding speed ($\underline{V}_{pn}$) vary in the lengthwise direction of the joint, an average mean wire feed speed ($\underline{V}_{tpmm}$) corresponding to the mean value of the polygon areas of the cross-sections of the joint being determined and the mean wire feed speed ($\underline{V}_{tpnm}$) for the respective cross-section of the joint being calculated as a function of the average mean wire feed speed ($\underline{V}_{tpmm}$) and the ratio of the polygon area ($\underline{P}_{pn}$) of the current cross-section of the joint to the mean value ($\underline{P}_{pm}$) of the polygon areas, whereas a set mean welding speed ($\underline{V}_{pm}$) is associated with the mean value of the polygon areas of the cross-sections of the joint and the welding speed ($\underline{V}_{pn}$) for the respective cross-sections of the joint is calculated as a function of the mean welding speed and the ratio of the mean value ($\underline{P}_{pm}$) of the polygon areas to the polygon area ($\underline{P}_{pn}$) of the current cross-section of the joint.

13. A method as claimed in claim 9 wherein the value determined for the polygon area ($\underline{P}_{Lpn}$) of the intermediate layer in each cross-section of the joint is calculated as a function of corner points ($P_2, P_3, P_5, P_6$) of the polygon area, the corner points ($P_2$) and ($P_3$), which are the points of intersection between the joint bottom and the joint sides of the intermediate layer, being measured during the deposition of the bead (80) first deposited in that layer against one of the joint sides at a predetermined distance (I) from that joint side whereas the corner point ($P_5$), which is the point of intersection between the upper face of the first deposited bead and said one joint side is measured during the deposition of the bead (81) deposited immediately thereafter against the other joint side, whereas the corner point ($P_6$), which is the point of intersection between the upper face of the bead deposited against said other joint side and said other said joint side, is calculated by means of a measured height ($h_1$) of said first deposited bead, which in accordance with the formula ($h_2 = (h_1 \times \sqrt{S^2_{pn}/S^1_{pn}})$), wherein $S^2_{pn}$ and $S^1_{pn}$ are the corresponding bead areas of the two deposited beads, provides the height ($h_2$) and consequently the point of intersection in the bead deposited against the other joint side.

14. A method as claimed in claim 13, wherein the beads of the intermediate layer may be increased by one bead compared with a preceding layer, should the calculated polygon area ($P_{Lpn}$) of the intermediate layer exceed ($S_0 \times (Z+1)$), wherein ($S_0$) is the nominal bead area, (Z) the number of beads in the preceding layer and (1) is a constant, for instance 0.5.

15. A method as claimed in claim 13 the bead areas of the additional beads in the same intermediate layer may are achieved by interpolation of the bead areas of the two beads deposited against the joint sides (84, 85), and the corresponding wire feed speeds ($V^x_{t\,pn}$) are proportional to the bead areas ($S^x_{pn}$).

16. A method as claimed in claim 9 wherein the position of the weld beads in each cross-section of the joint is obtained by positioning the weld beads closest to the joint sides such that the desired penetration into said sides is obtained, whereas the position of the intermediate beads is calculated with the aid of the distance between the bead centers, i.e. the weld pitch ($L_{pn}$) according to a formula:

$$L_{pn} = L_0^{(1+k)};\ k \geq 0,$$

$$L_{pn} = 1 - (1-L_0)^{(1-k)};\ k < 0,$$

wherein ($k = (k_{spn} - k_{fpn}) \times F$), (F) being an empirically determined constant coefficient of intensification.

17. A method as claimed in claim 9 wherein after deposition of an intermediate layer in the joint and prior to the deposition of the subsequent layer the quotient is calculated between the mean value ($P_{pm}$) of the polygon areas ($P_{pn}$) of the cross-sections of the remaining cross-sections (90) of the joint and the mean value of the cross-sectional areas (91) of the last deposited intermediate layer in all cross-sections of the joint, and in that top beads in a top layer are deposited in the joint on top of said intermediate layer when the quotient is less than a set value, preferably less than 0.7.

18. A method as claimed in claim 17 wherein the number of beads in the top layer is increased by one, compared to the number of the last deposited intermediate layer, if the area (Ac) of the top layer satisfies the condition ($Ac > S_0 \times Z \times V_{tmax}/V_{tpmm}$), wherein ($S_0$) is the nominal bead area, (Z) the number of beads in the last deposited intermediate layer, ($V_{tpmm}$) the average mean wire feed speed and ($V_{tmax}$) is the highest conceivable wire feed speed.

19. A method as claimed in claim 3, wherein the bead areas of the additional beads in the same intermediate layer are achieved by interpolation of the bead areas of the two beads (84, 85) deposited against the joint sides, and the corresponding wire feed speeds ($V^x_{t\,pn}$) are proportional to the bead areas ($S^x_{pn}$).

20. A method as claimed in claim 4, wherein when at least three beads (80, 81, 83) are deposited in the joint to form an intermediate layer, the distance between the weld bead centers, the so called weld pitch ($L_{pn}$), is determined for each cross-sectional of the joint as a function of the so called symmetrical weld pitch ($L_0$) and the coefficient of inclination ($k_{spn}$) of the inter-connection line of the current cross-section of the joint interconnecting the edges of said joint and/or the co-efficient of inclination ($k_{fpn}$) of the joint bottom, wherein $L_0 = b/z$ and b is the width of the joint bottom of the current cross-section of the joint.

* * * * *